(12) United States Patent
Furukawa et al.

(10) Patent No.: US 9,539,926 B2
(45) Date of Patent: Jan. 10, 2017

(54) HINGE MECHANISM (71) Applicant: TOYOTA BOSHOKU KABUSHIKI KAISHA, Aichi-ken (JP)

(72) Inventors: Kenji Furukawa, Aichi-ken (JP); Hiroshi Tsuchida, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 8 days.

(21) Appl. No.: 14/071,915

(22) Filed: Nov. 5, 2013

(65) Prior Publication Data
US 2014/0124634 A1 May 8, 2014

(30) Foreign Application Priority Data

Nov. 6, 2012 (JP) .................. 2012-244193

(51) Int. Cl.
| A47K 1/08 | (2006.01) |
| B60N 3/10 | (2006.01) |
| A47F 5/00 | (2006.01) |
| B60R 7/00 | (2006.01) |
| A47C 7/62 | (2006.01) |
| B60N 3/00 | (2006.01) |
| B29L 31/22 | (2006.01) |
| B29L 31/44 | (2006.01) |
| B29L 31/00 | (2006.01) |
| B29C 49/00 | (2006.01) |
| B29C 49/20 | (2006.01) |

(52) U.S. Cl.
CPC ........... *B60N 3/102* (2013.01); *B29C 49/0031* (2013.01); *B29C 2049/2017* (2013.01); *B29C 2049/2034* (2013.01); *B29L 2031/22* (2013.01); *B29L 2031/448* (2013.01); *B29L 2031/7502* (2013.01); *B60N 3/001* (2013.01); *B60N 3/002* (2013.01); *B60N 3/004* (2013.01); *B60N 3/10* (2013.01); *B60N 3/101* (2013.01); *B60N 3/106* (2013.01); *B60N 3/108* (2013.01)

(58) Field of Classification Search
CPC ........... B60N 3/102; B60N 3/10; B60N 3/103; B60N 3/101; B60N 3/001; B60N 3/002; B60N 3/004; B60N 3/01
USPC .......... 248/310, 311.2; 224/545; 297/188.02, 297/188.05, 188.06, 188.14, 188.2, 297/188.21; 264/263
See application file for complete search history.

(56) References Cited

U.S. PATENT DOCUMENTS

| 4,299,241 | A | * | 11/1981 | Seiller ........................... 132/279 |
| 4,819,843 | A | * | 4/1989 | Nakayama ............. B60N 3/103 108/44 |
| 4,861,540 | A | * | 8/1989 | Nieboer et al. ............... 264/263 |
| 5,092,652 | A | * | 3/1992 | Macaluso ............. A47B 13/16 108/26 |

(Continued)

FOREIGN PATENT DOCUMENTS

JP 2010-162928 7/2010

*Primary Examiner* — Jonathan Liu
*Assistant Examiner* — Taylor Morris
(74) *Attorney, Agent, or Firm* — Greenblum & Bernstein, P.L.C.

(57) ABSTRACT

A hinge mechanism includes a resin base member, and a support rotatably and pivotally mounted to the base member. The base member is formed by blow molding so as to be hollowed. The base member integrally includes a hinge member for rotatably and pivotally mounting the support to the base member. The hinge member is set in a molding die for clamping at the time of the blow molding of the base member, so as to be molded integrally with the base member.

8 Claims, 6 Drawing Sheets (56) References Cited

U.S. PATENT DOCUMENTS

| | | | | |
|---|---|---|---|---|
| 5,143,337 | A | * | 9/1992 | Tomayko et al. .......... 248/311.2 |
| 5,516,191 | A | * | 5/1996 | McKee ................... 297/188.15 |
| 5,673,890 | A | * | 10/1997 | Duesterberg .......... B60N 3/106 |
| | | | | 224/926 |
| 5,673,891 | A | * | 10/1997 | Fujihara et al. .......... 248/311.2 |
| 5,738,322 | A | * | 4/1998 | Huang ...................... 248/278.1 |
| 5,944,240 | A | * | 8/1999 | Honma ........................ 224/281 |
| 6,059,243 | A | * | 5/2000 | Hikage et al. ............. 248/311.2 |
| 6,325,962 | B1 | * | 12/2001 | Kmiecik et al. ............... 264/523 |
| 6,347,590 | B1 | * | 2/2002 | D'Annunzio et al. .......... 108/44 |
| 7,891,623 | B2 | * | 2/2011 | Haddad et al. ............ 248/311.2 |
| 2003/0122392 | A1 | * | 7/2003 | Larsen et al. ................ 296/24.1 |
| 2005/0224676 | A1 | * | 10/2005 | Stavermann ............... 248/311.2 |

* cited by examiner

HINGE MECHANISM

INCORPORATION BY REFERENCE

The disclosure of Japanese Patent Application No. 2012-244193 filed on Nov. 6, 2012 including the specification, drawings and abstract is incorporated herein by reference in its entirety.

BACKGROUND OF THE INVENTION

1. Field of the Invention

The invention relates to a hinge mechanism. More particularly, the invention relates to a hinge mechanism including a resin base member and a support pivotally mounted to the base member.

2. Description of Related Art

As a cup holder for a vehicle, there has been known such a cup holder that a support is rotatably and pivotally mounted to a resin base member, and when a beverage container is inserted in a round hole formed in the base member, the support is pushed downward and unfolded, so that the support supports the beverage container from a lower side (Japanese Patent Application Publication No. 2010-162928 (JP2010-162928 A)). The support is fitted and assembled to a hinge member integrally provided in the resin base member, and the support is supported pivotally between a stored state in which the support is put on the base member compactly and a usage state in which the support is unfolded.

SUMMARY OF THE INVENTION

However, there is such a method, for example, in which a hinge member is inserted at the time of injection molding of a base member, as a method for assembling a hinge member to a resin base member in a simple and good-appearance manner, but it is preferable that the hinge member be assembled to the base member in a similar state even in a case where the base member is molded by a method except for the injection molding. According to the invention, a hinge member is easily assembled to a resin base member with an excellent appearance.

A hinge mechanism according to one aspect of the invention includes a resin base member, and a support rotatably and pivotally mounted to the base member. The base member is formed by blow molding so as to be hollowed. The base member integrally includes a hinge member for rotatably and pivotally mounting the support to the base member. The hinge member is set in a molding die for clamping at the time of the blow molding of the base member, so as to be molded integrally with the base member.

According to the first aspect, at the time of blow molding of the base member, the hinge member is set in the molding die for clamping so as to be molded integrally with the base member, thereby making it possible to easily assemble the hinge member to the base member having a hollow shape, with a unified and excellent appearance.

In the first aspect, the base member may be provided as a table attached to a vehicle seat; and when the support rotates from the table in an opening direction, the support may be configured to be a cup holder for supporting a beverage container between the support and the table.

According to this configuration, the table attached to the vehicle seat is formed so as to be lightweighted by the blow molding, and it is possible to easily assemble the hinge member for pivotally mounting the support that is opened from the table so as to function as the cup holder, to the base member with a unified and excellent appearance.

Further, the hinge member may be provided with a flange portion formed in that bottom portion of the hinge member which is embedded in the base member at the time of the blow molding of the base member, in such a manner that the flange portion has a shape expanded in directions perpendicular to an embedding direction.

According to this configuration, the flange portion is formed in the bottom portion of the hinge member, so that a parison is molded so as to be applied onto the flange portion (so as to cover the flange portion from outside), at the time of the blow molding of the base member. This makes it possible to mold the hinge member firmly integrally so as not to be easily pulled out from the base member.

A second aspect of the invention is a manufacturing method of a hinge mechanism including a resin base member and a support rotatably and pivotally mounted to the base member. In this manufacturing method, a hinge member for rotatably and pivotally mounting the support to the base manner is provided integrally with the base member. The hinge member is set in a molding die for clamping at the time of blow molding of the base member, and the hinge member is molded integrally with the base member at the time of the blow molding of the base member.

According to the second aspect, it is possible to mold, by blow molding, a hinge mechanism having an excellent appearance in which hinge mechanism a hinge member is molded integrally with a base member.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment to perform the invention will be described below with reference to the drawings.

Figure 1:
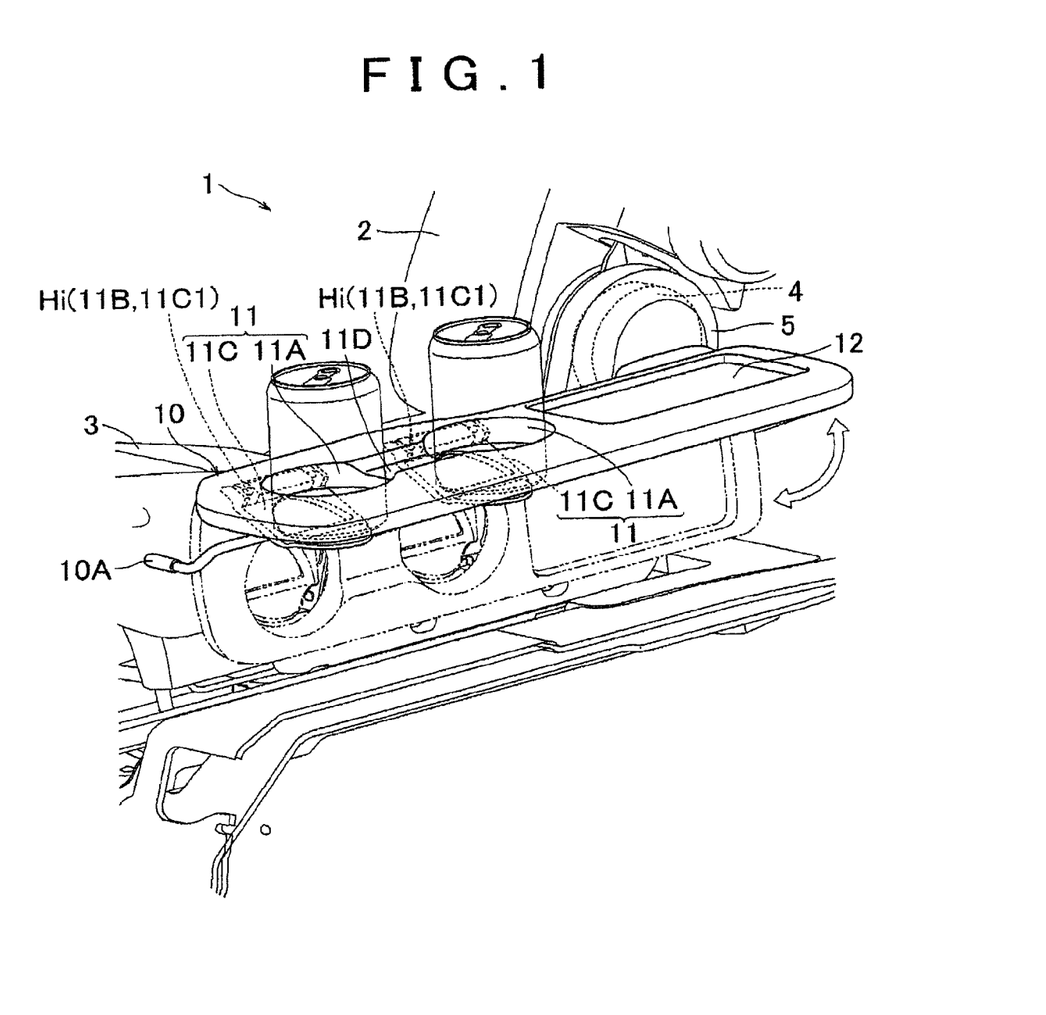
FIG. 1 is a perspective view illustrating a schematic configuration of a table to which a hinge mechanism of Embodiment 1 is applied.

Initially described is a configuration of a hinge mechanism Hi of Embodiment 1 with reference to FIGS. 1 to 6. As illustrated in FIG. 1, in a foldable table 10 attached to a side portion of a vehicle seat 1 on an inner side in a vehicle-width direction (a right side in the figure), the hinge mechanisms Hi of the present embodiment are configured as mechanisms for rotatably and pivotally mounting, to a bottom portion of the table 10, supports for two cup holders 11 provided in the table 10. Here, the vehicle seat 1 is configured as a seat provided behind a driver seat, in a second row in a vehicle including three rows of seats. The vehicle seat 1 includes a seat back 2 serving as a backrest for a sitting occupant, and a seat cushion 3 serving as a seat portion.

Lower end portions of the seat back 2 on right and left sides are respectively connected to rear end portions of the seat cushion 3 on right and left sides via respective reclining devices 4 provided therebetween. The reclining device 4 functions as a rotating shaft device that is able to stop its rotation. According to this configuration, the seat back 2 is connected to the seat cushion 3 in a state where a backrest angle is freely adjustable in a front-rear direction. Note that a basic structure of each of the reclining devices 4 has the same well-known configuration as described in documents such as Japanese Patent Application Publication No. 2011-116303 (JP2011-116303 A), and therefore a detailed description thereof is omitted herein.

Resin shields 5 are provided to cover right and left side portions of the seat cushion 3 such that the resin shields 5 outwardly conceal the right and left side portions so as to protect them. In addition to right and left side faces of the seat cushion 3, the shields 5 also outwardly cover respective connection portions of the rear end portions of the seat cushion 3 on the right and left sides with respect to the lower end portions of the seat back 2 on the right and left sides.

Figure 2:
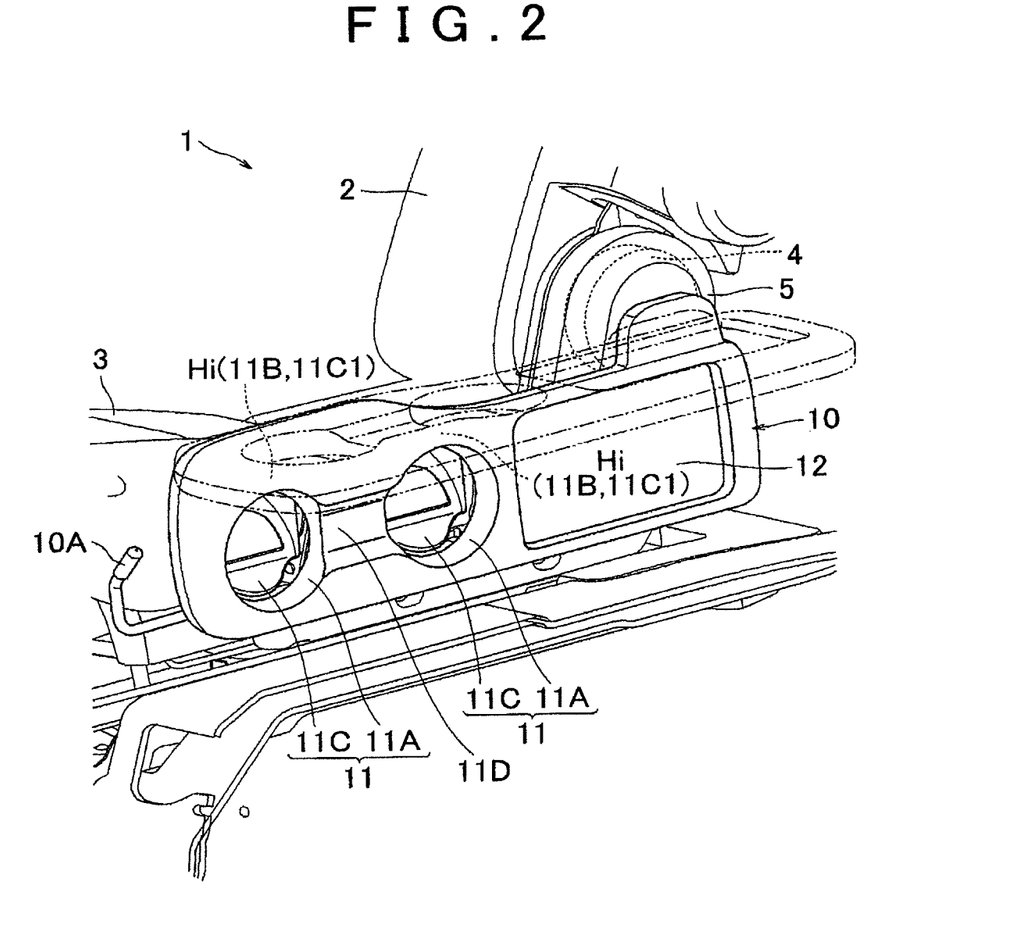
FIG. 2 is a perspective view illustrating a state where the table is folded.

On a side portion of the seat cushion 3 on a right side in the figure corresponding to the inner side in the vehicle-width direction, the foldable table 10 including the two cup holders 11 to which a sitting person is able to set a beverage container, and a recessed small tray 12 that the sitting person is able to use to put small stuff thereon is provided. The table 10 is formed in a plate shape that is elongated in a vehicle longitudinal direction, and is raisably and rotatably hinge-connected to the side portion of the seat cushion 3 on the inner side in the vehicle-width direction via a bracket (not shown). Hereby, the table 10 is provided to be switchable between a state (usage state) where the table 10 is unfolded toward a horizontal direction from the side portion of the seat cushion 3 on the inner side in the vehicle-width direction as illustrated in FIG. 1, and a stored state where the table 10 is turned downward so as to be folded on the side portion of the seat cushion 3 on the inner side in the vehicle-width direction as illustrated in FIG. 2.

An operation to switch the table 10 between the usage state and the stored state is performed such that the sitting person turns a control lever 10A provided so as to project in front of the table 10, in a direction where the sitting person wants to rotate the table 10. The control lever 10A is provided so as to be connected to a rotating shaft portion of a link mechanism (not shown) for connecting the table 10 to the side portion of the seat cushion 3. When the sitting person operates the control lever 10A so as to twist the control lever 10A in a direction where the sitting person wants to rotate the table 10, the link mechanism (not shown) performs a link motion to perform bending and stretching, thereby rotating the table 10 between the usage state and the stored state.

In a state where the table 10 is unfolded to a usage position, the link motion of the link mechanism (not shown) in a stretching direction causes each link member to rotate to a turnover position beyond a stretching position and to be retained. The link mechanism has a stopper function to support the table 10 from a lower side so that the table 10 is not pushed downward from the usage position even if a load is applied to the table 10 from an upper side in the usage state of the table 10.

The two cup holders 11 are provided side by side in the front-rear direction in a forward region of the table 10 in the front-rear direction. As illustrated in FIG. 1, the cup holders 11 are each constituted by a round hole 11A formed so as to penetrate the table 10 in a board-thickness direction, and a support 11C rotatably and pivotally mounted to a hinge member 11B provided in the bottom portion of the table 10. The round hole 11A functions as an insertion opening for surrounding and holding an outer peripheral portion of a beverage container when the beverage container is inserted therein from an upper side. When the beverage container is inserted in the round hole 11A, the support 11C rotates so that the support 11C is pushed open downward so as to function as a seat for catching the beverage container while supporting the beverage container from the lower side. Here, each mechanism configured such that the support 11C is rotatably and pivotally mounted to the bottom portion of the table 10 serves as the hinge mechanism Hi.

Figure 3:
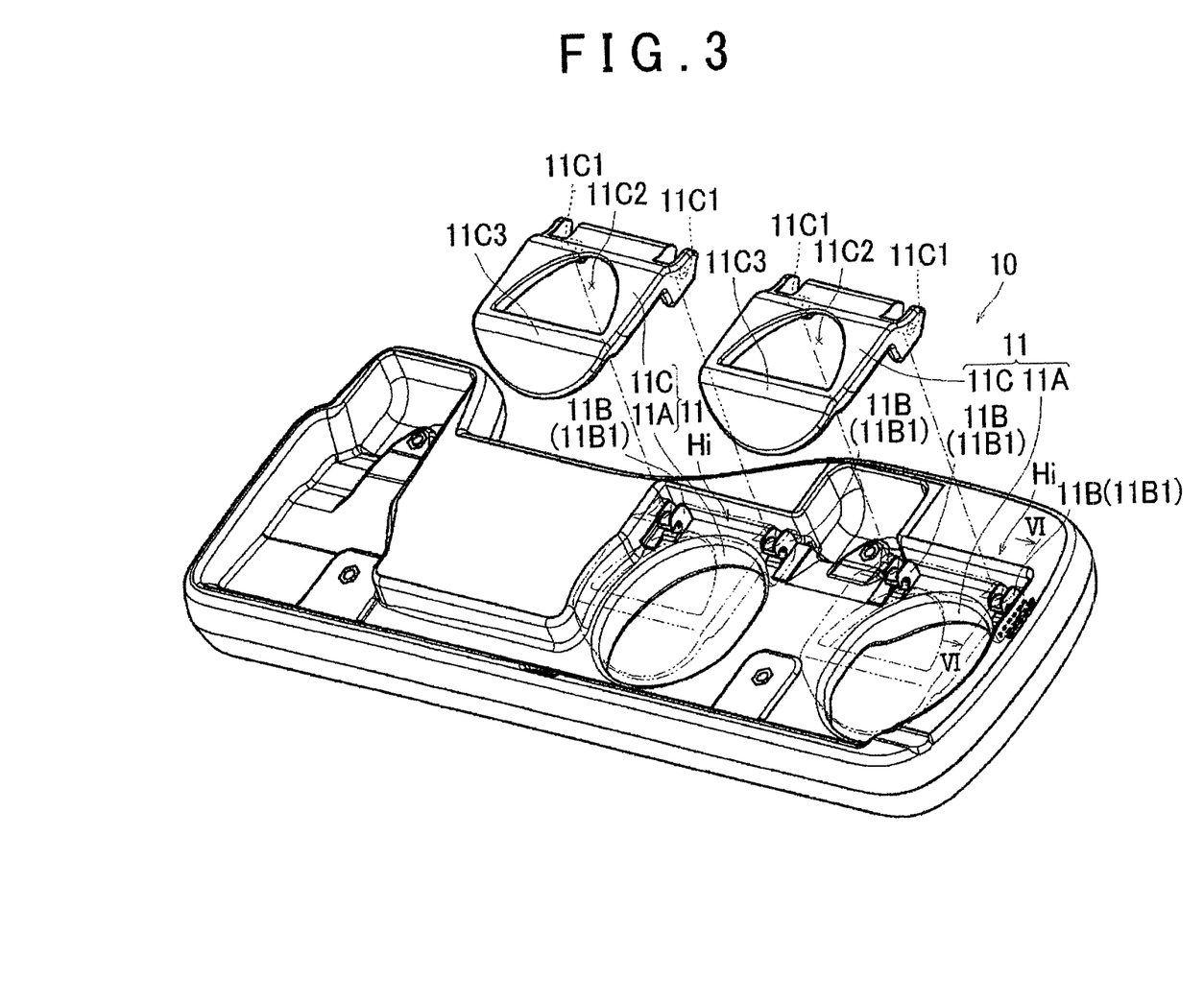
FIG. 3 is an exploded perspective view of a cup holder when the table is viewed from a lower side.

As illustrated in FIG. 3, each of the supports 11C is formed in a plate shape, and configured such that two pivot pins 11C1 placed in the front-rear direction are coaxially provided side by side integrally with respective edge portions of the support 11C on a side where the support 11C is connected to the bottom portion of the table 10. The pivot pins 11C1 of each of the supports 11C are respectively fitted to hook portions 11B1 of two hinge members 11B provided side by side in the front-rear direction on a peripheral part of each of the round holes 11A formed in the bottom portion of the table 10, so that the support 11C is assembled to the hinge members 11B in a state where the support 11C is rotatably and pivotally supported by the hinge members 11B. This assembling allows the support 11C to rotate between a state (see FIG. 2) where the support 11C is folded on the bottom portion of the table 10 so as to cover the round hole 11A, and a state (see FIG. 1) where the support 11C moves away from the round hole 11A such that the support 11C is opened from the bottom portion of the table 10.

Figure 4:
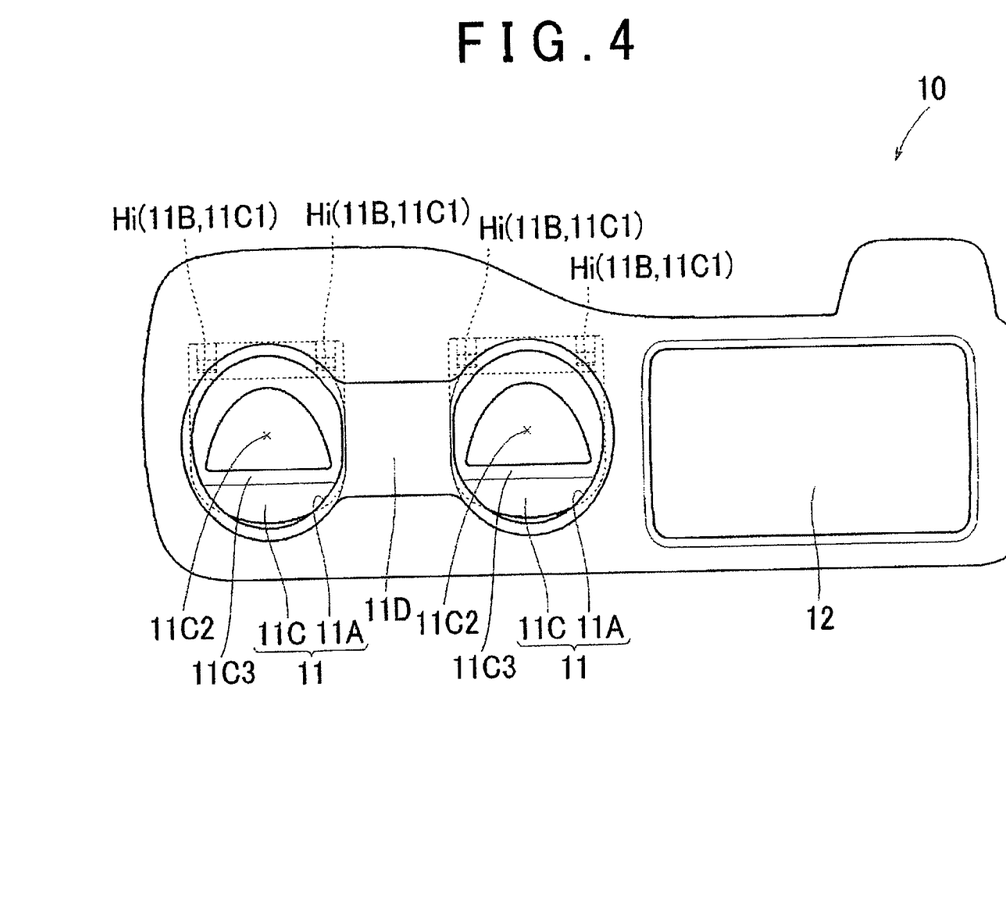
FIG. 4 is a plane view of the table.
Figure 5:
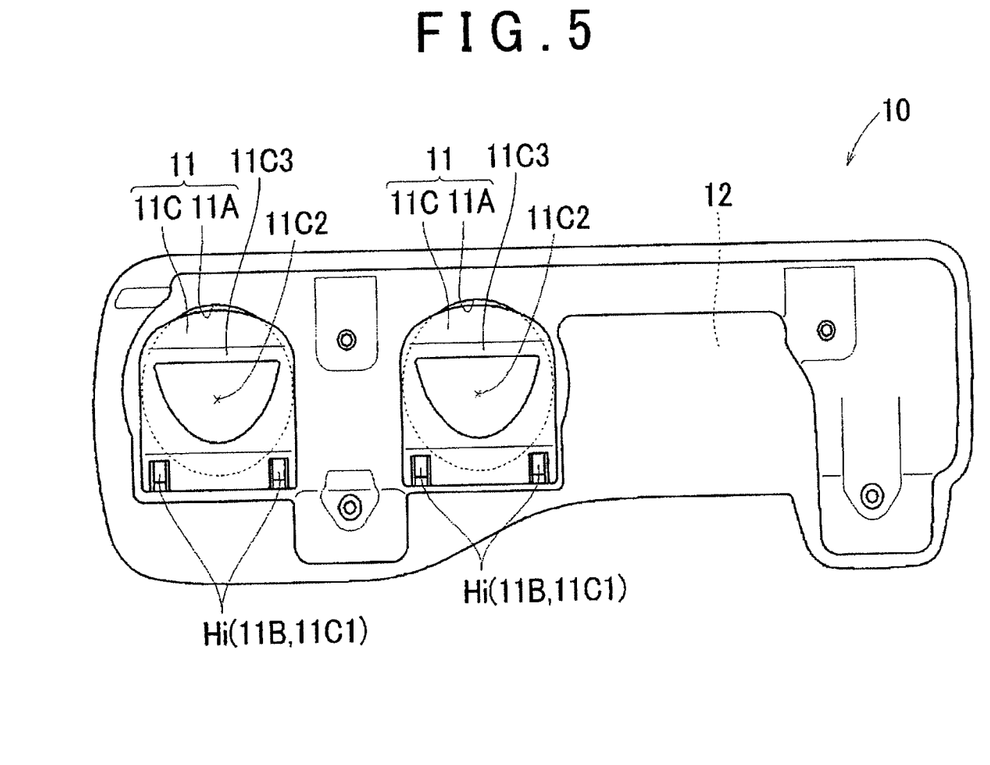
FIG. 5 is a bottom view of the table.

The support 11C is regularly biased in a direction where the support 11C is folded on the bottom portion of the table 10, due to a biasing force of a torsion spring (not shown) wound around a hinge-connected portion between each of the pivot pins 11C1 and each of the hinge members 11B. Hereby, as illustrated in FIGS. 4 to 5, in a free state, the supports 11C are folded on top of the bottom portion of the table 10 so as to be held thereby. Accordingly, as illustrated in FIG. 2, when the table 10 is in the stored state where the table 10 is folded on the side portion of the seat cushion 3 on the inner side in the vehicle-width direction, the supports 11C are placed between the table 10 and the side portion of the seat cushion 3 so that the supports 11C are folded compactly and held therebetween.

As illustrated in FIG. 1, in the usage state where the table 10 is unfolded at a horizontal position, when a beverage container is inserted in either one of the round holes 11A from the upper side, a corresponding support 11C that is placed at a side of the round hole 11A in which the beverage container is inserted is unfolded and rotated downward to a predetermined oblique angle position such that the support 11C is pushed by the beverage container, and retained in a state where the support 11C supports the beverage container from the lower side.

Here, as illustrated in FIG. 3, the supports 11C each include a receiving hole 11C2 formed to be opened substantially in a semicircular shape. When a beverage container is inserted in the round hole 11A of the table 10, the receiving hole 11C2 is in a state where a bottom-side corner of the beverage container is received in the hole thus opened in the semicircular shape. In association with a movement of the beverage container to be inserted downward, a bottom portion of the beverage container reaches a bottom portion 11C3 of the receiving hole 11C2, and the support 11C is unfolded and rotated downward in such a manner that the bottom portion 11C3 of the receiving hole 11C2 is pushed downward by the bottom portion of the beverage container.

When projection pieces (not shown) formed in vicinal areas to the pivot pins 11C1 of the support 11C hit a bottom face of the table 10, a movement of the support 11C to be unfolded downward is stopped at the predetermined oblique angle position. Further, when the beverage container is removed from the round hole 11A, the support 11C is folded again on the bottom portion of the table 10 so as to be held thereby, due to the biasing force of the torsion spring (not shown).

On an upper surface of the table 10 between regions where the respective round holes 11A are formed, a recessed portion 11D that is dented as compared with a general surface of the table 10 so as to connect the round holes 11A is formed. Due to the recessed portion 11D, the round holes 11A are designed to be grouped such that the round holes 11A are connected as a pair, and regions of the two cup holders 11 thus connected by the recessed portion 11D are expressed as one region sectioned from other regions.

In the meantime, the aforementioned table 10 is hollowed by blow molding of resin, so that the table 10 is lightweighted. Further, the hinge members 11B provided in the bottom portion of the table 10 are set in a molding die for clamping at the time of blow molding of the table 10, so that the hinge members 11B are provided integrally with the bottom portion of the table 10 in a state where bottom portions of the hinge members 11B are buried in the bottom portion of the table 10. The following describes a configuration of each of the hinge members 11B in detail.

Figure 6:
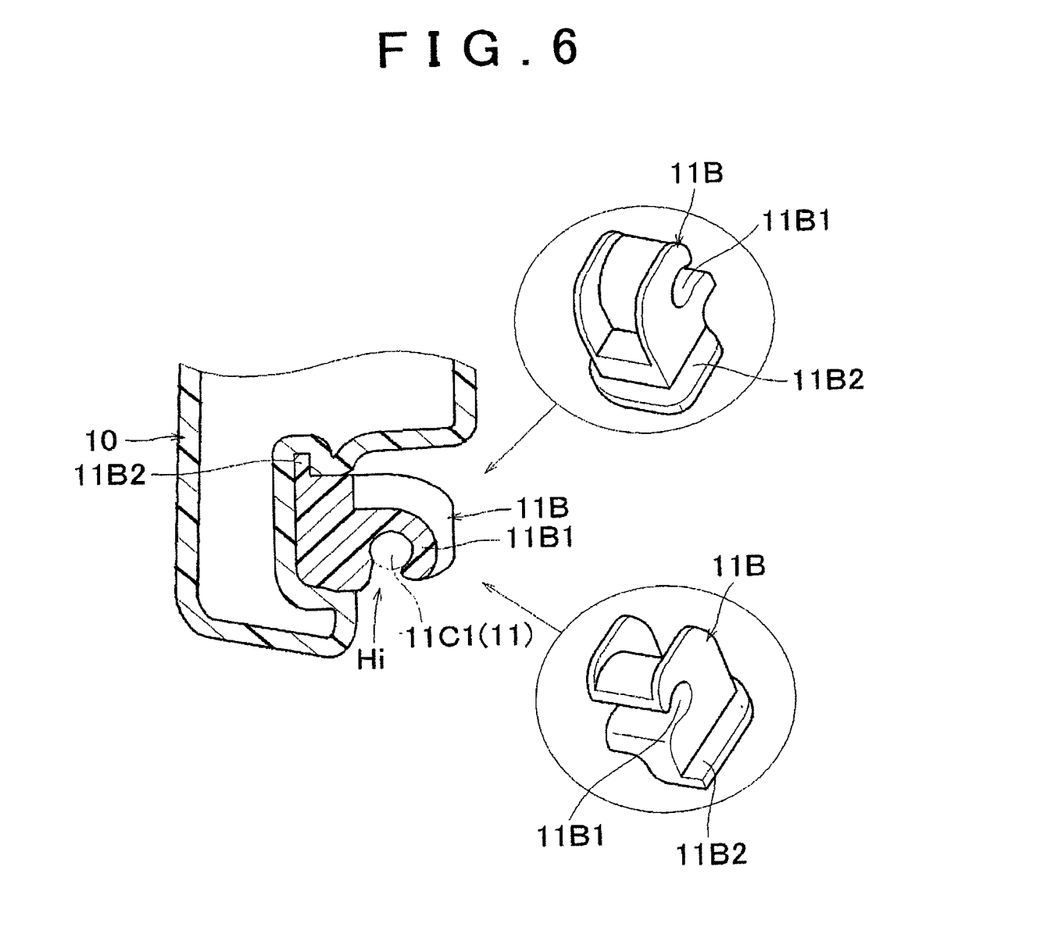
FIG. 6 is a sectional view taken along a line VI-VI of FIG. 3.

As illustrated in FIG. 6, each of the hinge members 11B is formed by injection molding of resin so as to integrally include the hook portion 11B1 for rotatably connecting the pivot pin 11C1 of the support 11C thereto in a coaxial manner by fitting the pivot pin 11C1 thereto, and a flange portion 11B2 embedded in the bottom portion of the table 10 at the time of the blow molding of the table 10 so as to be molded integrally. The flange portion 11B2 is formed in a peripheral part of that bottom portion of the hinge member 11B which is embedded in the bottom portion of the table 10, in such a manner that the flange portion 11B2 is expanded in three directions perpendicular to an embedding direction.

At the time of the blow molding of the table 10, the hinge member 11B in which the flange portion 11B2 is formed is set in a state where the hook portion 11B1 to be placed at a head side is pinched by a molding die for performing clamping of a parison, so that the table 10 and the hinge member 11B are molded integrally by the clamping of the parison such that the parison is applied onto the flange portion 11B2 (the parison covers the flange portion 11B2 from outside). Hereby, the flange portion 11B2 of the hinge member 11B is embedded in the bottom portion of the table 10, so that the hinge member 11B is molded firmly integrally with the table 10 so as not to be easily pulled out therefrom.

As such, the hinge member 11B is set in the molding die for clamping so as to be molded integrally with the table 10 at the time of the blow molding of the table 10, thereby making it possible to easily assemble the hinge member 11B to the table 10 having a hollow shape, with a unified and excellent appearance.

The embodiment of the invention has been described above with reference to one example, but the invention can be performed in various embodiments other than the above example. For example, the "hinge mechanism" of the invention is not limited to application to a mechanism (the hinge mechanism Hi) for rotatably and pivotally mounting the support 11C of the cup holder 11 to the table 10 as exemplified in the above example. The hinge mechanism of the invention has a configuration applicable to various embodiments provided that the hinge mechanism is configured as "a hinge mechanism including a resin base member and a support rotatably and pivotally mounted to the base member."

Further, in a case where the "hinge mechanism" of the invention is employed as a mechanism for rotatably and pivotally mounting a support of a cup holder to a base member such as a table, the support may be configured such that the support is opened upward from the base member such as the table, and when a beverage container is inserted in a round hole formed in the support, the support holds the beverage container in a state where the support surrounds an outer peripheral portion of the beverage container, and the base member supports a bottom portion of the beverage container from a lower side.

Further, the above example exemplifies the hinge member 11B including the hook portion 11B1 for rotatably and pivotally supporting the pivot pin 11C1 provided in the support 11C by fitting the pivot pin 11C1 thereto, as the embodiment of the "hinge member" of the invention. However, the "hinge member" of the invention may be a pivot pin that rotatably and pivotally supports a hook portion provided in a support by fitting the hook portion to the pivot pin.

Further, the "hinge member" of the invention may be configured such that a bottom portion to be embedded in a base member at the time of blow molding of the base member is formed in a sleeveless shape without a flange portion. Alternatively, instead of the flange portion, a recessed portion into which a parison goes radially inwardly may be formed in an outer peripheral portion of a bottom portion of a hinge member, so that the outer peripheral portion of the hinge member is firmly connected with the parison. Alternatively, instead of the flange portion, an outer peripheral portion of a hinge member may be formed in a tapering shape from its bottom portion toward its head portion, so that the hinge member is hard to come out of the base member.

Further, the "hinge member" of the invention may be made of a metal material.

What is claimed is:

1. A hinge mechanism comprising:
   a resin base member that defines a table and is configured to be attached to a vehicle seat; and
   a support rotatably and pivotally mounted to the base member, wherein
   the base member integrally includes a plurality of hinge members for rotatably and pivotally mounting the support to the base member,
   each of the plurality of hinge members include a portion that is embedded within the base member to prevent the respective hinge member from being pulled out from the base member,
   the base member and the support are rotatable from a folded stored state to an unfolded usage state, and
   when the support is unfolded to the usage state and supports an object between the support and the base member, the support is rotated to a predetermined oblique angle position relative to the base member.

2. The hinge mechanism according to claim 1, wherein the base member is attached to the vehicle seat, and
   when the support rotates from the table in an opening direction, the support is configured to be a cup holder for supporting a beverage container between the support and the table.

3. The hinge mechanism according to claim 1, wherein
the portion of each of the plurality of hinge members
  includes a flange portion that is embedded in the base
  member in such a manner that the flange portion has a
  shape expanded in directions perpendicular to an
  embedding direction of the respective hinge member.

4. The hinge mechanism according to claim 1, wherein
the portion of each of the plurality of hinge members is a
  bottom portion of the respective hinge member and is
  embedded within a bottom portion of the base member,
  and
a flange portion extends in a peripheral part of the bottom
  portion of the respective hinge member such that the
  flange portion is embedded into the bottom portion of
  the base member perpendicular to an embedding direction of the bottom portion of the respective hinge
  member.

5. The hinge mechanism according to claim 4, wherein
the flange portion extends perpendicular to the embedding
  direction of the bottom portion of the respective hinge
  member into the bottom portion of the base member.

6. The hinge mechanism according to claim 3, wherein
each of the plurality of hinge members include a hook
  portion for rotatably connecting to the support, and the
  hook portion is provided on an upper portion of the
  respective hinge member.

7. The hinge mechanism according to claim 4, wherein
each of the plurality of hinge members include a hook
  portion for rotatably connecting to the support, and the
  hook portion is provided on an upper portion of the
  respective hinge member.

8. The hinge mechanism according to claim 1, wherein
the base member is a blow molded resin base member,
each of the plurality of hinge members are injection
  molded resin hinge, and
the blow molded resin base member surrounds the portion
  of each of the plurality of hinge members so that each
  of the plurality of hinge members are integrally
  included with the blow molded resin base member.

* * * * *